United States Patent
Ohtani et al.

(10) Patent No.: US 7,001,683 B2
(45) Date of Patent: Feb. 21, 2006

(54) SEPARATOR FOR FUEL CELL AND METHOD FOR PRODUCING THE SAME

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/245,301

(22) Filed: Sep. 18, 2002

(65) Prior Publication Data

US 2003/0064273 A1    Apr. 3, 2003

(30) Foreign Application Priority Data

Sep. 19, 2001  (JP) ............................ 2001-285129
Sep. 19, 2001  (JP) ............................ 2001-285159

(51) Int. Cl.
 *H01M 8/02*   (2006.01)
 *B05D 5/12*   (2006.01)

(52) U.S. Cl. ..................... 429/34; 427/115; 427/125; 428/672

(58) Field of Classification Search ............... 429/34, 429/12, 129, 144, 247; 428/672, 681, 685, 428/548, 566, 615; 427/115, 125

See application file for complete search history.

(56) References Cited

U.S. PATENT DOCUMENTS

2001/0006702 A1 *  7/2001  Hisada et al. ............... 427/115
2001/0028974 A1 * 10/2001  Nakata et al. ............... 429/34

FOREIGN PATENT DOCUMENTS

JP          10-228914       *  8/1998

* cited by examiner

*Primary Examiner*—Raymond Alejandro
(74) *Attorney, Agent, or Firm*—Arent Fox PLLC

(57) ABSTRACT

A separator for a fuel cell includes a gold covering layer formed on the surface of stainless steel plate. A method for producing a separator, prevents exfoliation and fracture of the gold covering layer but obtains corrosion resistance and durability. Voids are formed by intergranular corrosion treatment at a surface of the stainless steel plate, and the gold covering layer is formed so as to be embedded in the voids. Limit value of radius of curvature in bends in which exfoliations or fractures in the gold covering layer is formed can be reduced by satisfying the equation $0.2 \leq 4/d/L \leq 80$ wherein $L(\mu m)$ is the average grain size of the surface of stainless steel plate, and $d(\mu m)$ is the thickness of the gold covering layer.

4 Claims, 2 Drawing Sheets

Thickness of test piece after compression forming to thickness of test piece before compression forming (%)

Thickness of the gold plating layer after compression forming to thickness of the gold plating layer before compression forming (%)

SEPARATOR FOR FUEL CELL AND METHOD FOR PRODUCING THE SAME

BACKGROUND OF THE INVENTION

1. Technical Field

The present invention relates to a separator for solid polymer electrolyte fuel cells, and relates to a method for producing the separator.

2. Related Art

In solid polymer electrolyte fuel cells, a separator is applied to both sides of a plate-shaped electrode (MEA: Membrane Electrode Assembly) to form a unit having a layered structure, and the plural units are stacked to form a fuel cell stack. The MEA is a three-layered structure, in which a polymerized electrolytic membrane made from a resin such as an ion-exchange resin is held by a pair of gas diffusion electrode plates (positive electrode plate and negative electrode plate). The gas diffusion electrode plate is made by a gas diffusion layer formed outside of a catalytic layer which contacts the polymerized electrolytic membrane. The separator is layered in order to contact the gas diffusion electrode plate of the MEA, and gas passages and coolant passages where the gas is circulated between the gas diffusion electrode plate and the separator are formed. According to the fuel cell, hydrogen gas as a fuel is provided to the gas passages facing the gas diffusion electrode plate at the negative electrode side, and an oxidizing gas such as oxygen or air is provided to the gas passages facing the gas diffusion electrode plate at the positive electrode side, and thereby electricity is generated by electrochemical reaction.

The separator must have characteristics that electrons generated by the catalytic reaction of the hydrogen gas at the negative electrode side are supplied to an external circuit, while electrons from the external circuit are supplied to the positive electrode side. As the separator, electrically conductive materials such as carbon type materials or metal type materials are used. In particular, the metal type materials are advantageous because they have excellent mechanical strength and allow weight reduction and compact design when formed in a thin plate shape. A thin plate which is made from metallic materials with high-corrosion resistance, such as stainless steels and titanium alloys, and is formed into a corrugated plate may be mentioned as the metallic separator.

The following three factors may be mentioned when separators are exposed to the operating environment.

(1) Temperature: Since the operating temperature of the fuel cell is between room temperature and approximately 180° C., the separators are exposed to temperatures in this range.

(2) pH: In the fuel cell, water is produced by reaction of oxygen and hydrogen, and the water is emitted in the form of a vapor. When the temperature of the water vapor in gas passages formed in the separator decreases, condensed water adheres to the separator in droplets. The water accumulates between the MEA and the separator when the amount of water adhering increases. Then, the water adhering to the MEA readily contacts the polymerized electrolytic membrane. As a result, seoaration, or the like, in a substituent in the polymerized electrolytic membrane occurs, and the pH of the adhering water decreases due to the generation of hydrogen ions in the adhering water. As the substituent in the fuel cell, a sulfone group is typical, and as the above-mentioned adhering water, a liquid having acidity such as sulfuric acid is general.

The above-mentioned substituent is explained as follows. In the fuel cell, the cathode catalyst is supplied with hydrogen ions by transporting hydrogen ions which are generated from hydrogen on the catalyst at the hydrogen gas supply side (anode side) to the oxidized gas supply side (cathode side). Then, by reacting the hydrogen ion and the oxidizing gas on the cathode catalyst, the action of generating water is made to be the driving force, so that electrical power is continuously generated. Therefore, the polymerized electrolytic membrane of the fuel cell must be a polymerized electrolytic membrane of a positive ion conductive type which can move the hydrogen from the cathode side to the anode side. Therefore, in the side-chain of the polymerized electrolytic membrane molecule the combination group of the form which combines with the hydrogen ion must exist. In the fuel cell, the above-mentioned function is satisfied by arranging a part of the moleculae of the polymerized electrolytic membrane as the substituent of an acid type which combines with hydrogen ions. Since this substituent is of an acid type, when it is liberated from the polymerized electrolytic membrane, an acid is generated. Generally, as this substituent, one of a strong acid type which has strong binding power with hydrogen ions is used in order to improve transfer efficiency of the hydrogen ion, and therefore, this substituent is liberated to generate the acid, and the acid exhibits a low pH.

(3) Potential: The separators are placed at the fuel gas side and the oxidized gas side, and each side forms the positive electrode or the negative electrode of the fuel cell. Between the separators, an electromotive force obtained in the reaction is generated as a potential difference. Generally, a potential difference obtained by an electromotive force in the fuel cell which uses the hydrogen for the fuel gas and the oxygen for the oxidized gas is about 1.2 V at most for the following reason. That is, it is believed that the electromotive force obtained in the chemical reaction in which water is generated from the hydrogen and the oxygen is about 1.2 V in the operational temperature range of fuel cell from the theoretical calculations, and in actual power generation, it is similar to this numerical value, and an electromotive force of about 1 to 1.2 V is generated. When an austenitic stainless steel plate with high corrosion resistance is used as the separator, the dissolution rate of metal ion increases when the electromotive force exceeds about 0.9 V, thereby generating corrosion.

The separator for fuel cells is exposed to a corrosive environment depending on each factor of temperature, pH, and potential as mentioned above. Therefore, when a metallic separator is used, even if the separator is composed of a material (for example, SUS316L) which has high corrosion resistance, the separator is highly corroded. Therefore, for the separator, a corrosion resistance which is extremely high in the operating environments of fuel cells is required. In addition, it is necessary for the separator that press working be easy to form into a corrugated plate to form the gas passages and the coolant passages, and that the contact resistance with other members be extremely small in order to avoid decrease of the power generation voltage. In addition, it is also necessary that the separator be low in cost, because several hundreds separators may be used in one fuel cell stack.

It is believed that separators plated with high corrosion resistance metal on the surface of the stainless steel plate in which press working is easy are desirable as separators for fuel cells. The comparison with respect to the corrosion resistances of SUS316L of stainless steel, Cu, Ag, Pt, and Au was carried out under conditions of pH 3 sulphuric acid solution of 90° C. and corrosion current density of 1.2 V, and by respectively measuring these conditions. The following results were obtained: SUS316L: 156 $\mu$A/cm$^2$, Cu: 98 $\mu$A/cm$^2$, Ag: 38 $\mu$A/cm$^2$, Pt: 18 $\mu$A/cm$^2$, Au: 2 $\mu$A/cm$^2$. It is desirable that the corrosion current density be 10 $\mu$A/cm$^2$ or less in view of ensuring practical durability. It has been demonstrated that a metal which satisfies these conditions is gold. Therefore, a separator plated with gold on the surface of a material such as the stainless steel plate is promising as a separator for fuel cells.

However, it can be said that the adhesion is not very good when gold plating is performed on stainless steel by conventional methods, because the gold plating only physically adheres to the stainless steel. Therefore, when a separator in which an extremely small radius of curvature at a bend in a corrugated cross section is formed by press working, the gold plating is easily exfoliated due to failure of adhesion. When the exfoliation occurs, the contact resistance between the gold plating and stainless steel plate, which is the base metal, increases, and low contact resistance can not be obtained. Thus, it is not possible to satisfy necessary corrosion resistance requirements for the fuel cell when the exfoliated gold plating falls off and when cracks in the plating layer during press working are formed because exposed stainless steel plate is easily corroded.

SUMMARY OF THE INVENTION

Therefore, an object of the present invention is to provide a separator for fuel cells and a method for the producing the separator, in which exfoliation and cracks in a gold plating layer formed on a surface of a stainless steel plate can be prevented and the corrosion resistance and the durability can be remarkably improved.

The present invention provides a separator for fuel cell, comprising: a stainless steel plate; a gold covering layer formed on a surface of the stainless steel plate; voids formed by intergranular corrosion in the surface of the stainless steel plate; wherein the gold covering layer is formed so as to be embedded in the voids. As a stainless steel plate, for example, an austenitic stainless steel plate is used, and the grain boundaries on the surface are austenite grain boundaries. According to the separator for fuel cell of this invention, the corrosion resistance is improved by forming the gold covering layer on the surface of the stainless steel plate with the gold covering layer embedded in the voids formed on the surface of stainless steel plate by intergranular corrosion. Therefore, the gold covering layer is firmly adhered to the surface of the stainless steel plate by being physically anchored therein. Therefore, this prevents the gold covering layer in bends from being exfoliated and fractured, thereby demonstrating excellent durability, even if press working is performed in order to form gas passages and coolant passages.

The present invention provides a method for producing a separator for fuel cells which is suitable for production of a separator such as that described above. The method comprises: performing an intergranular corrosion treatment on a surface of a stainless steel plate; plaiting a gold covering layer on the treated surface of the stainless steel plate; and then press forming the stainless steel plate. It is possible to adopt, for example, a chemical etching process as a method for conducting intergranular corrosion treatment on the surface of the stainless steel plate and forming the voids on the surface of the stainless steel plate by the intergranular corrosion. As a method for plating the gold on the surface of the stainless steel plate, a typical plating method can be adopted. When the gold plating layer is formed, a part of the gold plating layer is embedded in the voids which are formed by the intergranular corrosion treatment. It is thereby possible to produce the separator of the invention such as described above.

In the invention, it is desirable that the grain size of the surface of stainless steel plate is small and a large number of grain boundaries exist since the adhesion of the gold covering layer increases by increasing the number of void formed in the intergranular corrosion treatment. However, when the gold covering layer is of a gold plating layer, since pitted defects easily arise in the gold plating layer at the grain boundaries, the defects increase when there are too many voids to increase the density thereof. In such conditions, when press working is carried out, each of the defects is connected by cracks, thereby forming fractures in the gold plating layer. Therefore, it is desirable that the grain size of the surface of stainless steel plate is of a size in a certain range. Furthermore, the above-mentioned anchoring effect is largely dependent on the thickness of the gold covering layer. The anchoring effect is well obtained when the gold covering layer is moderately thin. Therefore, it is possible to control the optimum grain size in proportion to the gold covering layer by controlling the anchoring distance per unit volume of the gold covering layer. As a result of examining a variety of aspects of this point, the inventors found that it is possible to obtain a sufficient anchoring effect when $0.2 \leq 4/d/L \leq 80$ is satisfied (L($\mu$m): the average grain size of the surface of stainless steel plate, and d($\mu$m): thickness of the gold covering layer). Therefore, this condition is a preferable embodiment of the invention.

In addition, the present invention also provides a method for producing a separator for fuel cell, the separator having a metallic plate of which surface is formed with a gold covering layer, the method comprising: forming the gold covering layer on the surface of the metallic plate as a base metal; and then compression forming the metallic plate. According to the invention, the physical anchoring effect is obtained since the gold covering layer is embedded by the compression forming in the voids formed at grain boundaries in the surface of the metallic plate. Therefore, the adhesion of the gold covering layer with the metallic plate is remarkably increased. Furthermore, defects such as pits and cracks are repaired by crushing these defects by the compression forming when defects exist in the gold covering layer before the compression forming. As a result, by providing the gold covering layer, a drastic improvement in corrosion resistance and durability is obtained. Furthermore, the contact area of the gold covering layer is increased in order that the above-mentioned defects are repaired, and the contact resistance is therefore reduced.

In the invention, an embodiment satisfying the following condition is preferable. That is, it is suitable that when the average thickness of the metallic plate before compression forming is dB and the average thickness of the gold covering layer before compression forming is dS, each of the average thicknesses d'B and d'S, which are values after the compression forming satisfy the following equations.

$$0.9 \times (dB+dS) \leq d'B+d'S \tag{1}$$

$$0.1 \times dS \leq d'S \leq 0.9 \times dS \tag{2}$$

The equation (1) shows that the entire thickness of the separator after compression forming is 90% or more of the entire thickness of the separator before compression forming, and the equation (2) shows that the thickness of the gold covering layer after compression forming is in a range of 10 to 90% of the thickness of the gold covering layer before compression forming.

FIG. 1 is a schematic cross section of the separator of the invention. As is shown in this figure, it is specified that the thickness of the gold covering layers 2 in the invention is a part without crystal grains 1a which constitute a metallic plate 1 and the thickness of the metallic plate 1 is a part from the extreme outside surface of a crystal grain 1a to the basal plane. FIG. 1 is a cross section of the separator after compression forming. According to the figure, in the surface of the metallic plate, there are voids 1b having grooves 4 due to the existence of the grain boundaries 1. The gold covering layers 2 is embedded in the voids 1b by the compression forming, and the adhesion of the gold covering layers 2 to the metallic plate 1 is improved by generating the anchoring effect.

The reasons of the equation (1) are as follows. When the entire thickness of the separator after compression forming is less than 90% of the entire thickness of the separator before compression forming, the work hardening generated by plastic deformation of the metallic plate which is base metal becomes frequent. It is not possible to perform softening processes such as annealing since the gold would diffuse in the separator in which the gold covering layer is formed. Therefore, work hardening occurs when the compression forming is performed in a range which deviates from the equation (1), and as a result, fractures are formed in the metallic plate during forming of the separator. Therefore, it is believed that the embodiment which satisfies the equation (1) is preferable in order to prevent formation of fractures due to the work hardening of the metallic plate. Furthermore, reasons for the equation (2) are as follows. The stress in the boundary surface between the metallic plate and the gold covering layer is concentrated and the boundary surface is roughened when the thickness of the gold covering layer after the compression forming is less than 10% of the thickness of the gold covering layer before the compression forming. In contrast, reparing of the pits and the cracks is insufficient when the thickness of the gold covering layer after the compression forming is more than 90% of the thickness of the gold covering layer before the compression forming. Therefore, it is believed that the embodiment which satisfies the equation (2) is preferable.

DETAILED DESCRIPTION OF THE INVENTION

An embodiment of the invention will be explained hereinafter with reference to the figures.

A large number of test pieces were prepared, which were composed of stainless steel (which corresponds to SUS316L) with the composition shown in Table 1 and which were 100 mm×100 mm square plates having 0.2 mm thickness, and whose average grain size L at the surface was 15 $\mu$m or 5 $\mu$m.

TABLE 1

| Composition of test pieces (stainless steel plates) (mass %) | | | | | | | | |
|---|---|---|---|---|---|---|---|---|
| C | Si | Mn | P | S | Ni | Cr | Mo | Fe |
| 0.03 | 0.5 | 2 | 0.04 | 0.03 | 13 | 17 | 2.5 | Balance |

These test pieces were classified into three groups A, B and C, and in the test pieces of each group, the grain boundaries in the surface were corroded by using chemical etching liquids of different types. The chemical etching liquids were of following 3 types.

group A: nitric acid 10%, hydrofluoric acid 4%, 50° C. bath group B: nitric acid 20%, hydrofluoric acid 8%, 50° C. bath group C: nitric acid 25%, hydrochloric acid 50%, glycerin 25%.

Next, the gold covering layer in which the thickness differed was applied to the surface of each test piece in each group.

Molten salt of the gold plating layer contained gold potassium cyanide: 12 g/l, potassium citrate: 125 g/l and EDTA cobalt salt: 3 g/l, the thickness of the gold plating layer was adjusted by properly changing the temperature of the molten salt, current density and time. After the gold plating layer was formed, when the average grain size of the surface of the stainless steel plate was defined as L($\mu$m) and the thickness of the gold plating layer was defined as d($\mu$m), 4/d/L was calculated. Then, the limit value of radius of curvature in the bend in which exfoliations or fractures in the gold plating layer in bending of each test piece was formed was examined. The relationship between the 4/d/L and the limit value of radius of curvature in the bend is as shown in FIG. 2.

Figure 1:
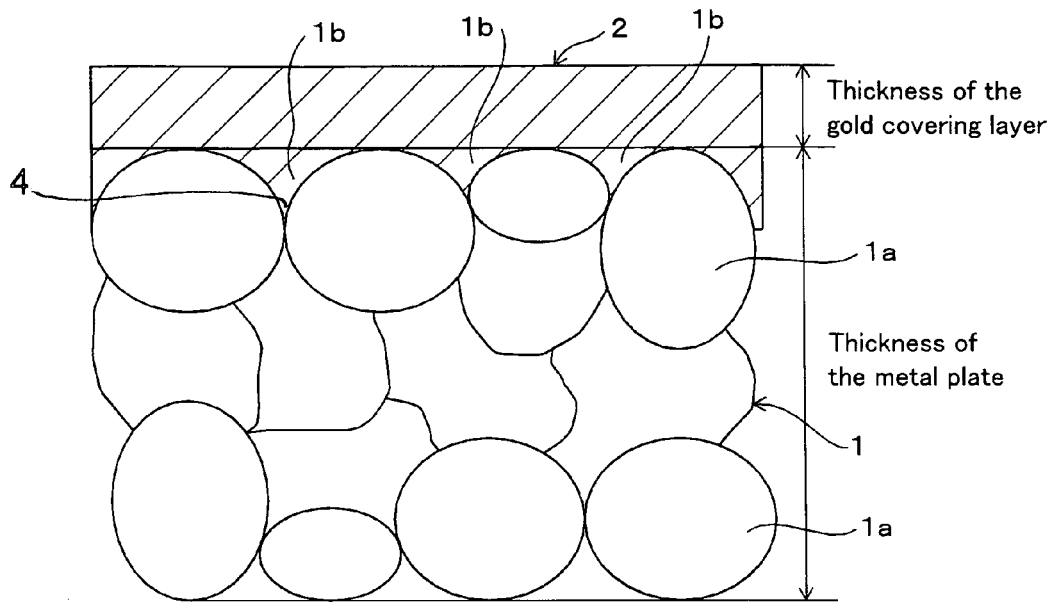
FIG. 1 is a conceptual cross section of the separator of this invention.
Figure 2:
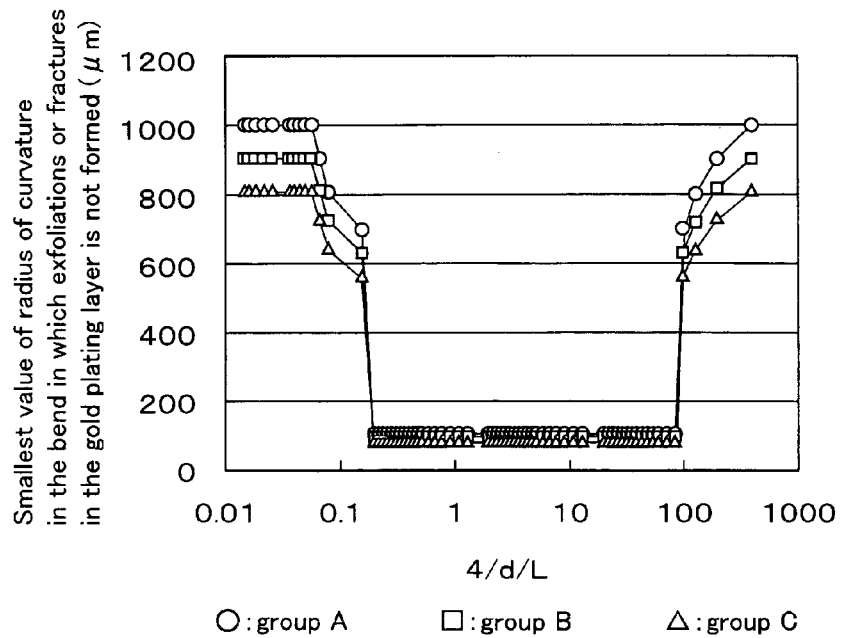
FIG. 2 is a diagram showing the relationship between a relational equation 4/d/L and the limit value of radius of curvature in the bend; wherein L($\mu$m) is the average grain size of the surface of stainless steel plate which is the base metal, d($\mu$m) is the thickness of the gold covering layer, and L($\mu$m) and d($\mu$m) are measured in embodiments of this invention.

According to FIG. 2, it is seen that when the average grain size of the surface of a stainless steel plate was defined as L($\mu$m) and the thickness of the gold plating layer was defined as d($\mu$m), the value of 4/d/L was in a range of 0.2≦4/d/L≦80, the radius of curvature was small, i.e. around 100 $\mu$m. In contrast, when the value of 4/d/L deviated from this range, the limit value of radius of curvature in the bend remarkably increased. Therefore, it was confirmed in a range of 0.2≦4/d/L≦80 that a separator which can retain extremely superior durability over a long term by preventing formation of exfoliations or fractures in the gold plating layer can be obtained.

Next, a large number of test pieces were prepared, which are composed of stainless steel (which corresponds to SUS316L) with the composition shown in Table 1 and which were 100 mm×100 mm square plates having 0.2 mm thickness.

The gold plating layer whose thickness was 0.5 mm was formed on the surface of these test pieces under the following conditions. The molten salt of the gold plating layer contained gold potassium cyanide: 12 g/l, potassium citrate: 125 g/l and EDTA cobalt salt: 3 g/l, the temperature of the molten salt was 35° C., the current density was 1 A/dm² and the processing time was 30 seconds. Next, the compression forming by changing pressure was produced for these test pieces in which the gold plating layer was formed. After the compression forming, in each test piece, the entire thickness of the separator, the thickness of the gold plating layer, the area ratio of fractures formed in a stainless steel plate which is base metal, and the area ratio of defects (such as pits and cracks) on the surface of the gold plating layer were respectively examined. The relationship between ratio of the thickness of test piece after the compression forming to the thickness of test piece before the compression forming in the embodiments of the invention, and the area ratio of fractures in the base metal, are shown in FIG. 3, and the relationship between ratio of the thickness of the gold plating-layer after the compression forming to the thickness of the gold plating layer before the compression forming and the area ratio of defects in the gold plating layer is shown in FIG. 4.

Figure 3:
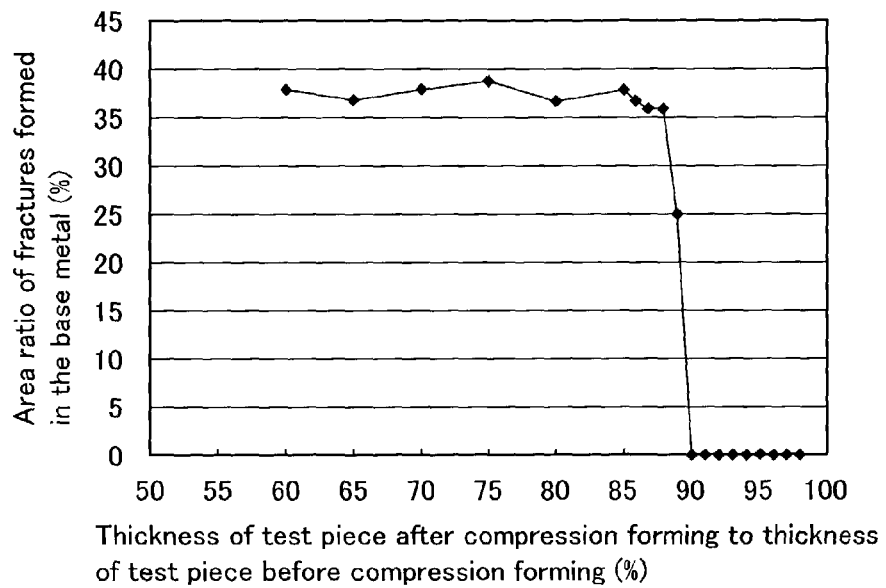
FIG. 3 is a diagram showing the relationship between ratio of the thicknesses of test pieces after compression forming to the thicknesses of test pieces before compression forming in the embodiments of this invention and area ratios of fractures in the base metal.
Figure 4:
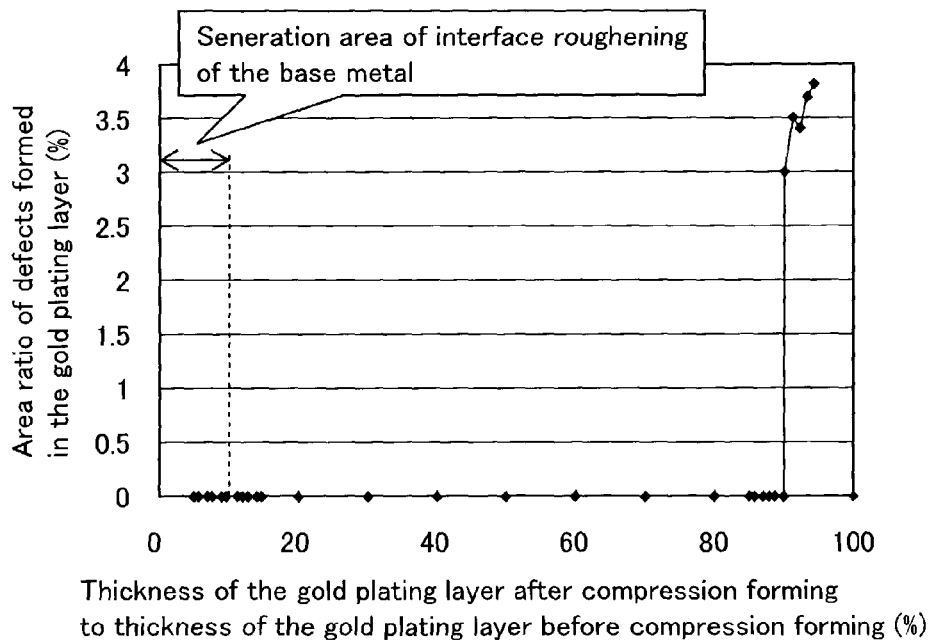
FIG. 4 is a diagram showing the relationship between ratio of the thickness of the gold covering layer after compression forming to the thickness of the gold covering layer before compression forming in embodiments of the invention, and area ratios of defects in the gold covering layer.

According to FIG. 3, it is demonstrated that when the entire thickness of the separator after the compression forming is 90% or more of the entire thickness of the separator before the compression forming, the area ratio of the fractures formed in the base metal is 0%. In contrast, when the entire thickness of the separator after the compression forming is less than 90% of the entire thickness of the separator before the compression forming, the area ratio of the fractures formed in the base metal is extremely large. Furthermore, according to FIG. 4, it is demonstrated that when the thickness of the gold plating layer after the compression forming is 90% or less of the thickness of the gold plating layer before the compression forming, the area ratio of the defects formed in the gold plating layer is 0%. In contrast, when the thickness of the gold plating layer after compression forming is more than 90% of the thickness of the gold plating layer before the compression forming, the area ratio of the defects formed in the gold plating layer extremely increased. However, it is also demonstrated that when the thickness of the gold plating layer after the compression forming is less than 10% of the thickness of the gold plating layer before the compression forming, the crystal grain of the base metal in the boundary surface between the stainless steel and the gold plating layer was exfoliated and roughed in the boundary surface. Therefore, it was confirmed that a separator having drastic improvement in corrosion resistance and durability could be obtained when the following conditions are satisfied: the entire thickness of the separator after the compression forming is 90% or more of the entire thickness of the separator before the compression forming and the thickness of the gold plating layer after the compression forming is in a range of 10 to 90% of the thickness of the gold plating layer before compression forming.

What is claimed is:

1. A separator for a fuel cell, comprising:
   a stainless steel plate;
   a gold covering layer anchored into a surface of the stainless steel plate;
   grooves formed by corrosion treatment using a chemical etching solution on a surface of the stainless steel plate, the grooves deepened toward grain boundaries and being deepest at the intersection of adjacent grain boundaries;
   wherein the gold covering layer is anchored so as to be embedded in the grooves by compression forming.

2. A separator for a fuel cell according to claim 1, wherein the separator satisfies the equation $0.2 \leq 4/(d \times L) \leq 80$ where L is the average grain size of the surface of the stainless steel plate, and d is the thickness of the gold covering layer.

3. A separator for a fuel cell according to claim 1, wherein the following equations $$0.9 \times (dB+dS) \leq d'B+d'S$$

$$0.1 \times dS \leq d'S \leq 0.9 \times dS$$

are satisfied (average thickness of the metallic plate before compression forming is dB, average thickness of the metallic plate after compression forming is d'B, average thickness of the gold covering layer before compression forming is dS, and average thickness of the gold covering layer after compression forming is d'S).

4. A separator for a fuel cell according to claim 3, wherein the thickness of the stainless steel plate after compression forming is 90% or more the thickness of the plate before compression forming and the thickness of the gold covering layer after compression forming is in the range of 10–90% of the gold covering layer before compression forming.

* * * * *